US010163110B2

(12) United States Patent
Griffith et al.

(10) Patent No.: US 10,163,110 B2
(45) Date of Patent: Dec. 25, 2018

(54) PRODUCT COUPONING AND SAMPLING METHOD

(75) Inventors: Lawrence Griffith, Calumet City, IL (US); Walid Johnson, Chicago, IL (US); Carlos M. Tarazona, Chicago, IL (US); Cameron Wilson, Cincinnati, OH (US); Thomas W. Humphrey, Cincinnati, OH (US)

(73) Assignee: Digital Factory Technologies, Inc., Chicago, IL (US)

( * ) Notice: Subject to any disclaimer, the term of this patent is extended or adjusted under 35 U.S.C. 154(b) by 1219 days.

(21) Appl. No.: 12/435,926

(22) Filed: May 5, 2009

(65) Prior Publication Data

US 2009/0276307 A1    Nov. 5, 2009

Related U.S. Application Data

(60) Provisional application No. 61/126,660, filed on May 5, 2008.

(51) Int. Cl.
*G06Q 30/02* (2012.01)
*G06Q 30/00* (2012.01)
*G06Q 30/06* (2012.01)

(52) U.S. Cl.
CPC ......... *G06Q 30/00* (2013.01); *G06Q 30/0217* (2013.01); *G06Q 30/0222* (2013.01); *G06Q 30/0601* (2013.01)

(58) Field of Classification Search
CPC ..................................................... G06Q 30/00
USPC ....................................................... 705/14.35
See application file for complete search history.

(56) References Cited

U.S. PATENT DOCUMENTS

| | | | |
|---|---|---|---|
| 6,736,322 B2 | 5/2004 | Gobburu et al. | |
| 6,775,539 B2 | 8/2004 | Deshpande | |
| 6,877,661 B2 | 4/2005 | Webb et al. | |
| 7,184,972 B2 | 2/2007 | Flaherty | |
| 7,942,319 B2 | 5/2011 | Bezancon | |
| 2003/0233276 A1* | 12/2003 | Pearlman et al. | 705/14 |
| 2005/0240418 A1* | 10/2005 | Chappuis | 705/1 |
| 2006/0206376 A1* | 9/2006 | Gibbs et al. | 705/14 |
| 2007/0262860 A1* | 11/2007 | Salinas et al. | 340/539.12 |
| 2008/0097851 A1* | 4/2008 | Bemmel et al. | 705/14 |
| 2009/0032584 A1* | 2/2009 | Yamada et al. | 235/380 |
| 2009/0076896 A1* | 3/2009 | DeWitt et al. | 705/14 |
| 2009/0157472 A1* | 6/2009 | Burazin et al. | 705/10 |
| 2009/0171939 A1* | 7/2009 | Athsani et al. | 707/5 |

* cited by examiner

*Primary Examiner* — Daniel M Sorkowitz
(74) *Attorney, Agent, or Firm* — Wood Herreron & Evans LLP (57) ABSTRACT

A targeted method for providing coupons and samples to consumers, that provides extensive feedback to manufacturers, identifies consumers that represent a desired demographic profile, enables a convenient consumer couponing experience, controls and contains fraud through the use of expiration methods and location data.

5 Claims, 4 Drawing Sheets

PRODUCT COUPONING AND SAMPLING METHOD

RELATED APPLICATION

The Present application claims priority to U.S. Ser. No. 61/126,660 filed May 5, 2008, the disclosure of which is hereby incorporated herein by reference in its entirety.

FIELD OF THE INVENTION

The present invention relates to methods for generating consumer interest in a product through product coupons and/or sampling.

BACKGROUND OF THE INVENTION

Manufacturers have long sought effective methods for generating consumer interest in products. One known method is providing consumers with coupons or sample vouchers for a product, enticing those consumers to sample the product and, hopefully, elect to purchase the product at a future time.

There are a variety of ways that products are delivered to consumers. In some cases, coupons and samples are manually distributed, either in relatively populated public places, or retail locations. This method has the disadvantage that the coupons and samples cannot be easily targeted to a particular consumer group, nor can the response of consumers to the product be easily tracked. In other cases, coupons and samples are delivered through the mail to consumers, and sample often are accompanied by coupons for retail purchase of the sampled item. This method permits targeted delivery of samples and coupons to consumers of interest; furthermore, the consumers' use of the coupons can be used to trace response to the mailed samples. However, this method is relatively expensive, and the use of coupons by consumers is difficult to track and provides minimal insight into the consumer's reaction to the product. In some cases, telephone inquiries are made to consumers who have received samples, seeking to obtain feedback. However, consumers often resent telephone surveys, and thus response rates are poor.

U.S. Pat. No. 6,026,370 describes a method of sample distribution based upon retail behavior. Specifically, based upon a consumer's purchases at the register of a retail store, coupons are printed for the consumer, offering discounts on products. The coupons may be redeemable at a retail site or provide a telephone number that can be contacted to request shipment of a free sample to the consumer. Products to be sampled may be selected at random from a pool of available samples, or based upon the consumer's demographics or purchasing patterns. Demographics and purchasing patterns may be identified from a single purchase event at a given location, or from multiple purchases or a mailing address which may be associated with a single consumer through the use of a credit card number and/or loyalty card.

More recently, a number of Internet-based methods have been implemented, exemplified by the web sites currently available at the domain names startsampling.com, freesamples.com and freesampleclub.com. Each of these services provides free samples to consumers that visit the web site and register to participate in sampling.

In the area of couponing, U.S. Pat. Nos. 7,184,972, 6,877,661, 6,775,539 and 6,736,322 describe various methods for distributing coupons in an electronic manner, e.g., using a display screen to display a coupon barcode that may be scanned at a point of sale.

Although these methods have been used to some effect, they also suffer from various difficulties. Existing methods of product couponing and product sampling have not been particularly cost effective, and have not provided accurate, reliable, and swift feedback from consumers spread over a large demographic area. Manufacturers continue to have difficulty obtaining product feedback, whether the product is promoted by sampling or couponing. Furthermore, manufacturers lack information regarding the consumer in-store experience and how it can influence product purchases. Furthermore, manufacturers have the concern that electronic coupons or vouchers, because they are not linked to tangible media (unlike traditional paper coupons), present no barrier to coupon fraud; specifically, a consumer is not required to accumulate and present multiple paper coupons to obtain coupon redemptions; a consumer could accomplish multiple redemptions using the electronically presented coupons, with not countervailing controls.

SUMMARY OF THE INVENTION

The invention provides a targeted method for providing coupons and samples to consumers that provides extensive feedback to manufacturers, identifies consumers that represent a desired demographic profile, enables a convenient consumer couponing experience, and controls and contains fraud through the use of expiration methods and location data.

The above and other objects and advantages of the present invention shall be made apparent from the accompanying drawings and the description thereof.

DETAILED DESCRIPTION OF THE INVENTION

Figure 1:
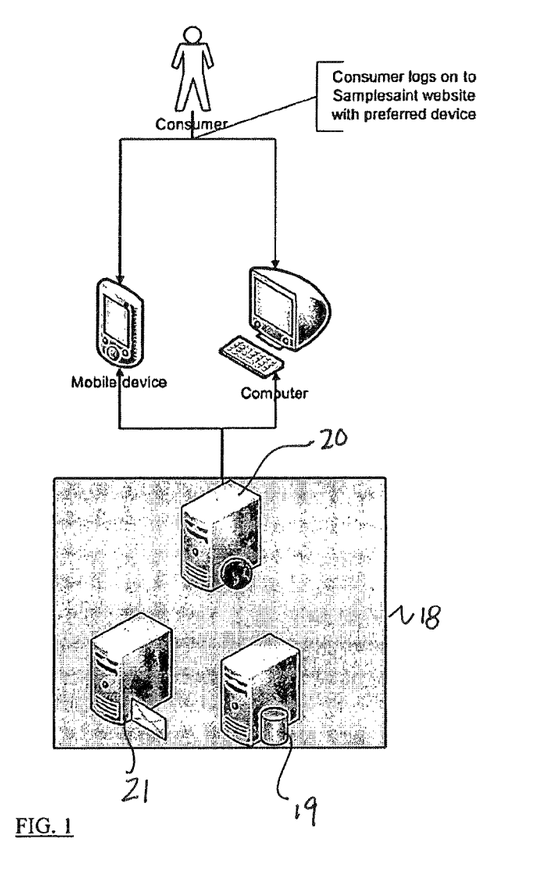
FIG. 1 is an illustration of a consumer's interface, via a mobile device or PC, to a server farm running a web application implementing the method of the present invention.

FIG. 1 illustrates a server farm 18 accessible by a user that implements principles of the present invention. This server includes the following elements:

- A database of coupons by UPC within a server 19.
- A front page for PC's at www.samplesaint.com and for mobile devices at m.samplesaint.com, within server 20. This front page will include links to locate product coupons, once the consumer has logged in.
- A page for finding products within server 20, that has an input textbox with a button called "find coupon" along with text explaining its use.
- A processing page within server 20, accessible from the find product page, that uses the coupon by UPC search and coupon related to UPC search and returns items to consumer if any.

A page to display the coupons list within server 20, by exact match first, and related coupons second.

Links for each result to go to a descriptions page within server 20.

A descriptions page within server 20 for the coupon selected that includes amount of coupon, title of product, expiration date, and terms and conditions and a link to add the coupon to my mobile shopping cart, a link to return to the list and a link to return to the search screen.

An active database within server 19 through which a coupon is added to a mobile shopping cart by adding the consumer ID, the coupon code (UPC-A or equivalent) and the expiration date.

A mail server 21.

Figure 2:
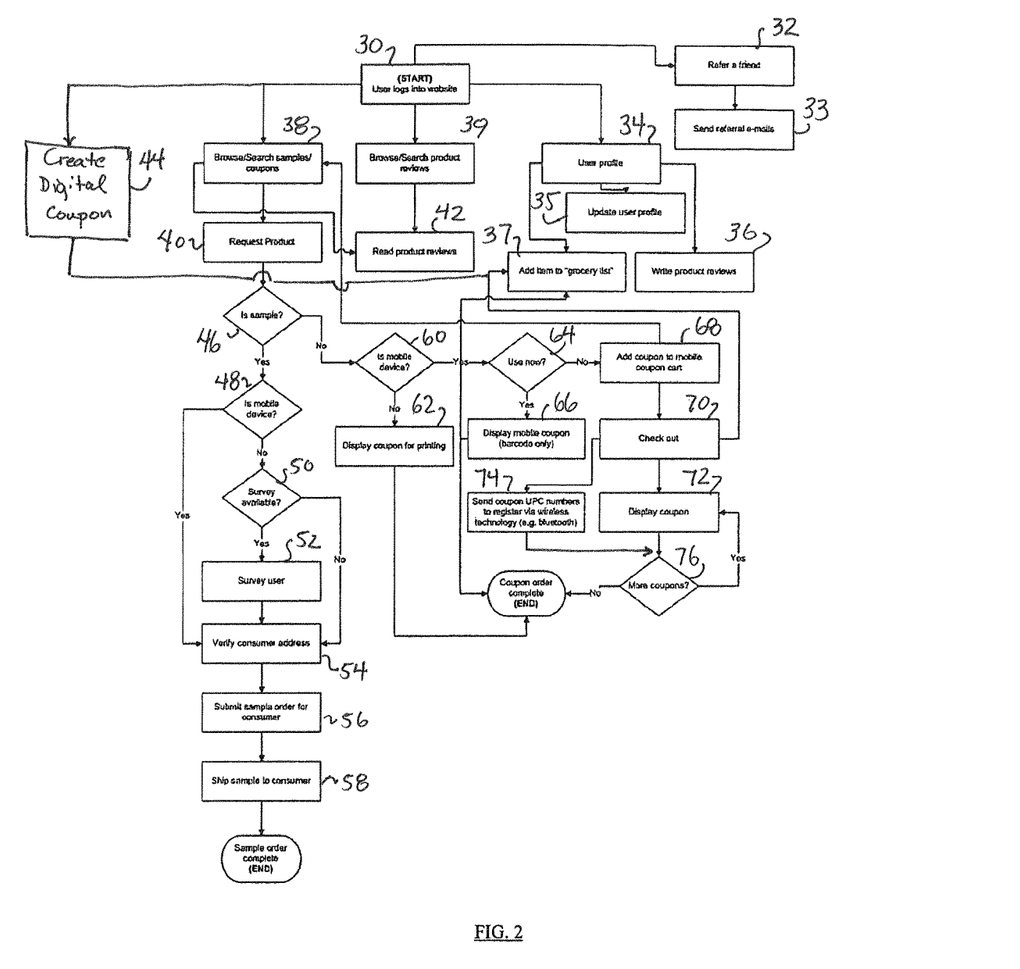
FIG. 2 is a flow chart of the steps involved in the use of the web application to perform steps of the present invention.

Use of the site will proceed as illustrated in FIG. 2. At the START 30 the user logs into the website, at which point the user has a number of choices:

Refer a friend 32, through which the user may send 33 a referral email via server 21 to a friend to join the web site community.

Create/edit a user profile 34. Through this page the user may update his/her demographic profile 35. The profile may include a link to a family group within which coupons and related shopping lists may be shared, as discussed below. Users may be rewarded for providing detailed profiles and/or for enrolling family by delivering additional coupons to them in exchange. Other consumer reward systems for other desirable consumer behavior are noted below. Users may also write product reviews 36. Finally, users may add 37 items that are desired for later purchase, to a "grocery list". This grocery list, which may be completely separate to coupons, or may be linked thereto, provides a convenient place to store a list of desired products, while simultaneously providing brand preference information that may be useful individually or in the aggregate to brand managers.

Browse samples and coupons 38. This page permits a user to browse available sample or coupon offers, which may be selected based on demographic information for the user. The user may also request 40 the sampling or couponing for a specific product, via the entry of the product's UPC code from the product package, or by a search process through a product database (such as is available in UPC code databases). The user may also read 42 product reviews.

Browse or search product reviews 39. This page allows a user to proceed directly to reading product reviews.

Create digital coupon 44. This page allows the consumer to convert a paper coupon the consumer has acquired to digital form. The conversion requires the consumer to enter the UPC code and coupon code for the coupon, and then a number of specific checks are performed to permit electronic redemption of the coupon:

1. The first number in the coupon code sequence should be "5" which is used to designate a manufacturer's coupon (as opposed to "99" which designates an in-store coupon, for example).

2. The length of the coupon code entered by the consumer is verified, which should include 13 total digits (beginning with a "5").

3. The value digits should match the value entered by the consumer from the face of the coupon.

4. Compare the check digits in the coupon code using the redundancy check methodology defined for manufacturer coupons.

Upon successful completion of these steps, to complete creation of a digital coupon 44 a bar code is generated and stored in the consumer's grocery list.

When a user requests 46 a product coupon or sample, processing branches depending upon whether the user is connected to a PC or a mobile device. Mobile device processing includes functions appropriate for a mobile device and allows the redemption of previously identified coupons or vouchers.

In the case of a request for a sample, on a PC (as determined at step 48) the consumer will be presented 52 with a survey (if one is defined as determined at step 50), followed by verification 54 of the consumer address and the generation 56 of a sample order. Via a mobile device (as determined at step 48), the survey may be skipped due to the difficulty in implementing a survey on such a device. In either case, the sample is shipped 58 to the consumer.

In the case of a request for a coupon from a PC (as determined at step 60), the coupon will be presented 62 to the user for printing. In the case of a coupon request on a mobile device (as determined at step 60), the coupon can be presented immediately 66 for bar code scanning, or alternatively, the coupon may be added 68 to a "mobile coupon cart" on the device. (The "display" or "cart" options are presented to the user in step 64.) This "cart" construct retains coupons identified during or prior to a shopping experience, so that those coupons may be systematically presented during checkout.

The checkout procedure 70 may be immediately initiated following the addition of a coupon to the "mobile coupon cart". Checkout presents 72 the bar code for each coupon or voucher in the mobile coupon cart on the display of the mobile device, or alternatively delivers 74 the UPC code for the coupon or voucher from the mobile device directly to the point of sale register, e.g. via a wireless connection such as by Bluetooth or other wireless technology. After the user scans or otherwise presents the coupon or voucher via bar code or otherwise, the user sequences the mobile device to present the next coupon or voucher in the mobile cart (as determined at step 76), or the process completes.

Figure 3A:
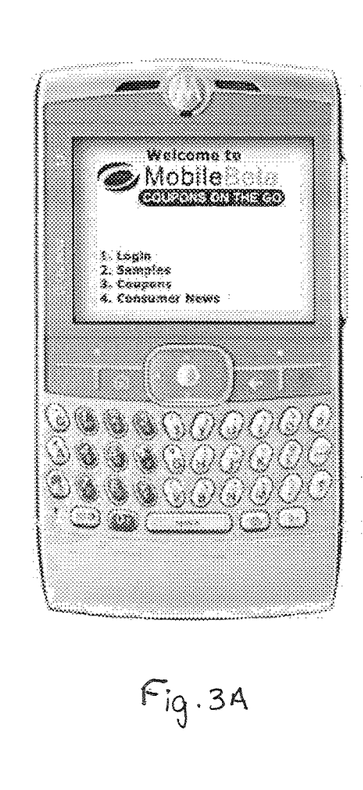
FIGS. 3A-3C is an illustration of the displays produced on a mobile device in steps of the present invention.
Figure 3B:
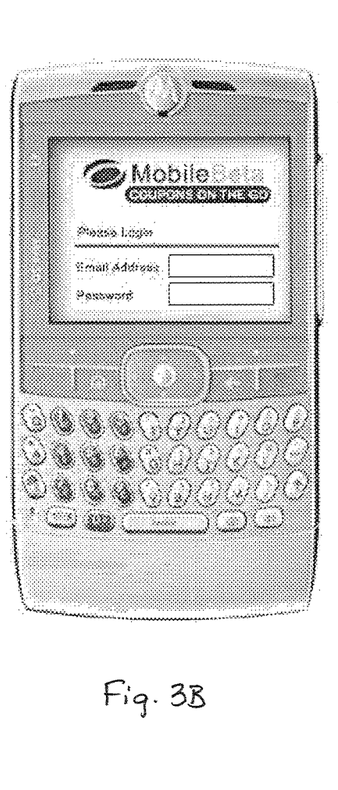
Figure 3C:
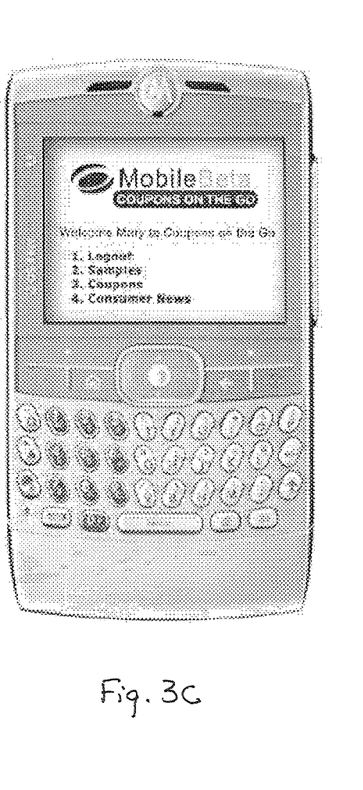

FIGS. 3A-3E illustrate the display of a mobile device communicating with the server. In FIG. 3A, the user is presented with the home page of the server, from which the user may view samples, coupons and consumer news, and login to the site. FIG. 3B illustrates the login page. FIG. 3C illustrates the home page after a consumer has logged in, which is now personalized to the user.

Figure 3D:
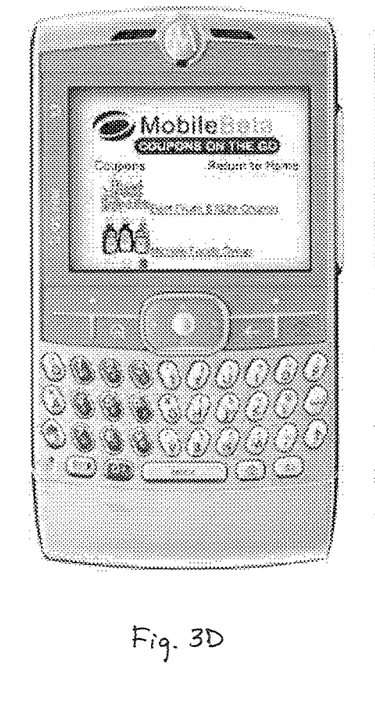
FIGS. 3D-3F are further illustrations of the displays produced on a mobile device in steps of the present invention
Figure 3E:
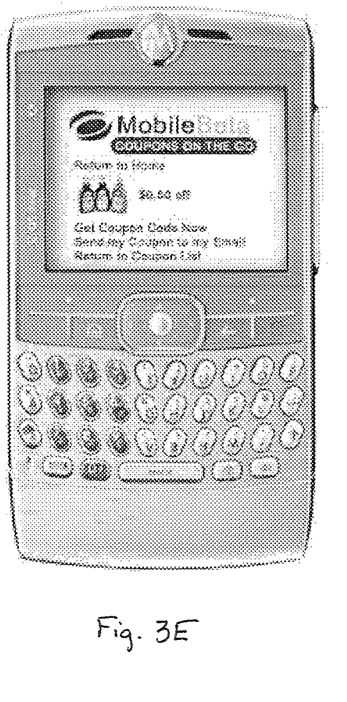
Figure 3F:
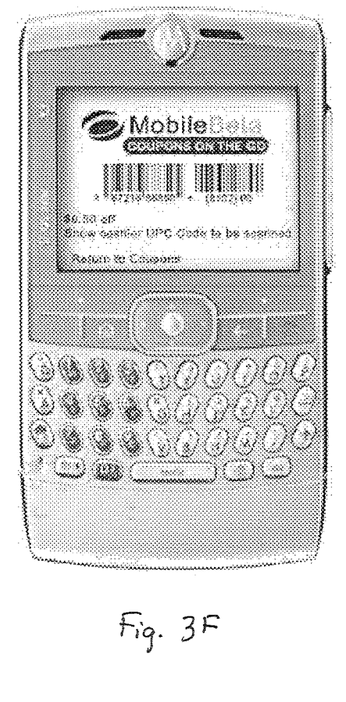

FIG. 3D illustrates the display of available coupons that may be added to the user's mobile shopping cart. If a particular product is selected, the product details are shown as seen in FIG. 3E, and options are provided to immediately view the coupon code, send the coupon to an email address for later printing, or view other coupons. If a coupon is selected for display, the bar code is presented as shown in FIG. 3E. This bar code may be scanned, or entered by the cashier.

As noted above, one concern regarding the use of digital coupon is that a consumer would have the ability to redeem that coupon repeatedly. Consumer Product Goods companies have identified this as coupon fraud and desire to prevent this from occurring. The present invention includes a process that can prevent this scenario from occurring. Specifically, the mobile device, which is a gateway to presentation of coupons to a point of sale, may implement an application (via a web browser or a downloaded mobile device application) that ensures that the coupon can only be used for a limited amount of time. Specifically, a coupon, once displayed from the mobile shopping cart, has a limited expiration time and cannot be redisplayed, nor can the coupon be regenerated for that particular login without the passage of a manufacturer-established time period.

Thus, the consumer use of the inventive server involves the following steps:

Consumer registers with Samplesaint

Depending upon implementation, consumer downloads the Samplesaint Application to mobile device Consumer adds coupons to mobile cart via a PC connected to the website or via the mobile device Coupons are now ready to be used at a store At checkout, the mobile device is used to open the Samplesaint mobile browser page, or mobile device application, and open mobile cart, and select checkout A prompt is displayed to confirm checkout and note the expiration of the displayed coupons Once the checkout is confirmed, the mobile device unlocks the barcodes for each coupon and starts a timer which will cause the coupons in mobile cart to expire in a predetermined amount of time The consumer then redeems the coupons at the register After the timer expires the mobile cart is disabled and expired coupon graphic appears Thus, by using the invention, the consumer's mobile device may be used for couponing, while assuring participating Consumer Product Goods companies that a control is provided against digital coupon fraud.

It will be appreciated that a mobile application utilized on the mobile device, may be a GPS enabled application, capable upon user approval of gathering GPS location information as the mobile device moves with the consumer. This information can then be delivered to the server to aid in coupon delivery and numerous other functions.

For example, the consumer's location may be determined when the user enters the checkout process, and this location indexed to the geolocations of known retailers, thereby creating a record of the number of redemptions that should be received from a given retailer, and providing data that can be used to detect fraudulent claims of redemptions by unscrupulous retailers.

In addition, GPS data may be used during a consumer's search for a product coupon, by indexing the actual aisle location of goods to the consumer's location, so as to present only those coupon or sample options relevant to a current shopping aisle. In addition, the consumer's location can serve as a basis for generating coupon offers, e.g., a consumer in the aisle or store that carries a promoted brand may be presented with offers to sample or use a coupon for that brand based upon their presence in that location.

Finally, the consumer's presence in a given location can be used to obtain consumer feedback useful to consumer product manufacturers. Specifically, in some cases a consumer may have placed a coupon or sample offer into the mobile shopping cart, but be unable to find the product on the shelves. In this case, the mobile shopping cart application may provide the user with the option to note that a coupon or sample in the shopping cart should not be redeemed for the reason that the item is "out of stock" or "could not be found" (thus distinguishing those cases from the case where the consumer does not redeem or removes the item for the reason that the item "was not purchased"). The data from a consumer that an item could not be found or was out of stock, combined with the specific retailer location of the consumer at the time of this event, can be delivered to the manufacturer to permit the manufacturer to remedy the situation by pursuing better shelf placement and/or restocking at that retail location.

Consumers may be rewarded for providing accurate information regarding out of stock products, once verified by the manufacturer, by offers of additional coupons beyond those normally available. Such rewards may overcome consumer hesitancy to provide GPS tracking information from their mobile device.

Consumers may also receive location based advertisements. From the website consumers select what their interests are and what types of stores they prefer. They accept any terms and conditions that apply to this service. Once signed up for the service Samplesaint begins tracking the consumers' registered mobile device. This service can be turned off at anytime, even via the mobile device.

There are two options for performing tracking. (Option 1—Service Provider) Using the consumers' service provider, Samplesaint uses the identification of the mobile device provided by the consumer and accesses the Service Provider's system to locate the mobile device. (Option 2—Mobile Applet) The consumer is instructed from either the browser site or their mobile device to install an applet on their mobile device. This applet provides the GPS coordinates back to Samplesaint.

Once the location of the consumer has been obtained, the information is then compared to the consumers' preferences and the available offers in the Samplesaint system along with a predefined radius for each store. When the consumer is within the radius defined in the Samplesaint system, and a match is found, a text message, or some form of notification is sent to the consumer about the offer. The consumer can then act on the offer.

The mobile device application or mobile device web site may also provide a grocery list function. The grocery list allows the consumer to track items they purchase from stores on a regular basis. The consumer can add items to their list and define the time the item has before it needs to be purchased again. When the item is recently purchased the item will appear green. When the item is nearing repurchase the item will appear yellow. Then when the item is due to be repurchased the item will turn red and if configured by the consumer send a notification to them that the item needs to be purchased. Also, if there is a coupon or special offer for an item at or about the time the notification is being sent to the consumer, it will go along with it. The grocery list is available from the web site and the mobile site.

From the website, using a search box consumers have the ability to search not only Samplesaints' website for coupons and samples, they have the ability to search the whole world for coupons and samples. Using specialized searching criteria consumers are limited to just coupons and samples in their results. Search capability may be obtained by partnering with a site like google.com to provide the searching technology is a likely solution for this search engine. Results are displayed inside of the Samplesaint website along with any advertisements that may be relevant to the search.

It will be noted that a consumer may use a paper coupon, delivered by conventional means, as an index to locate an electronic coupon and/or request an electronic coupon, using the bar coding on the paper coupon, or convert the paper coupon to an electronic coupon as described above. In this way a consumer might streamline the use of coupons by converting to an all-electronic methodology.

The invention permits a number of scenarios for consumer use of the system. For example:

Scenario 1. Ordering samples via mobile phone (delivered to physical address)
- (a) User logs into mobile website.
- (b) User views list of available samples (list is searchable by product categories).
- (c) User selects sample(s) desired from list.
- (d) User may be asked to take a short survey about the product.
- (e) Samples are then shipped to the user's household from the manufacturer.
- (f) User may be asked to take a short survey either some time after requesting the sample.

Scenario 2. Intelligent (location-based) delivery of coupons (2 processes)

(Process 1)
- (a) User goes to mobile website
- (b) User logs in (or is remembered via a cookie, etc.)
- (c) User is asked for permission to get user location (GPS coordinates)
- (d) User agrees, user is shown coupons relevant to stores near their current location
- (e) User goes to store, uses coupon (Process 2)
- (a) User goes to mobile website
- (b) User logs in (or is remembered)
- (c) User downloads and installs java app on their mobile phone
- (d) User runs application (maybe it runs all time)
- (e) Application contacts servers giving user location (this updates say every 10 minutes) or acquires location from GPS chip on mobile phone
- (f) When the user is near a store where they could use a coupon, a coupon is sent to their phone (e-mail, text message) and the phone alerts them
- (g) User goes to store, uses coupon Scenario 3. Ordering/Delivering coupons via mobile phone
- (a) User logs into to our mobile website.
- (b) User views list of available coupons (list is searchable by product categories).
- (c) User selects coupon(s) desired from list.
- (d) User may be asked to take a short survey about the product.
- (e) Coupons are displayed on the users mobile phone (with barcode if applicable).
- (f) Retailer verifies coupon and/or scans barcode when there is one.
- (g) User may be asked to take a short survey either some time after requesting the coupon or when we know they used the coupon (most coupons are not unique to each consumer).

An e-commerce site in accordance with principles of the invention provides, to consumers, an easy to use and fun portal that will allow consumers of various products to obtain free coupons and samples. This site will encompass a visually appealing and user-friendly home page that will be accessible by typing the domain name chosen for the website. For consumers, the domain name will be preceded by "www" while for a corporate client, it will be preceded by "corporate". This page will be very simple and provide a link to most parts of the site. It may have 1. An ad at the top. This ad could be a promotion or just an ad to a partner's e-commerce site. An ad server such as that provided by Microsoft, Google or the like, will manage this ad.
2. Intuitive Links: (should not be very prominent, and may appear at the bottom of the page)
3. Consumer's Customized links
4. Corporate Client links
5. Free coupon/sample search (results will be links but registration is required to gain access)

There will be two types of registration pages: The consumer registration page and the corporate registration page. Both pages will be accessible to the server's internal administrative staff.

The first page is the consumer registration page. This page will allow consumers to register in order to gain access to free sample products. It will be preceded by an agreement page, where consumers must click on "accept" to register. On this page, consumers will be asked for vital statistics which include but are not limited to Username (valid email address), password, confirmation of password, Name, Address, City, State, etc. Corporate clients will be asked for similar vital statistics as well.

The Login Page will allow the user to utilize their email address as their login id. However, the password will be anything chosen by the user. The password must be at least 5 characters in length. If a user is not found, another page will be displayed giving the user the option of registering or being sent their password.

Other considerations are meta tags. Each page will have the following meta tags embedded: Free, free sample, samples, sampling, etc. The site must use minimal cookies or none at all.

The site design will be distinctive, allowing the site to have a consistent, appealing look and feel across platforms. Inside the site will rely on standard hardware and LAN protocols to take advantage of cost efficiencies.

The site will provide a unique way for manufacturers to interact with the consumer through interactive marketing called Internet or mobile couponing or sampling. This form of couponing and sampling allows marketers to develop unparalleled relationships with consumers and link them directly to retailers. This includes Cell phones and palm held devices, as well as desktop computers, which are now an integral part of the digital landscape. To achieve optimal penetration to the consumer, the site will use interactive software as well as a unique marketing method that will continue to encourage the consumer to revisit the site and give them a medium to purchase manufactured goods. The site will also provide web-based services in conjunction with existing service providers and will receive royalties for resulting transactions.

Companies pay a monthly fee for automatic connection to potential consumers. Additional fees are added for market research information and market inquiries and other specific information that are in addition to what our company routinely provides. The service will pursue consumers for the companies, providing various marketing tactics and promotions to keep our consumers happy and coming back again. The companies will want to be a part of this network and will pay a fee to allow them access.

Users will have a central home page to manage all the samples that they have requested. This page will also allow them to view "receipts" of products requested or ordered. This central homepage will be password protected and the user will have the option of selecting his/her password.

The homepage will be customizable by users. Customizable information includes personal information and products of interest.

Users will also have a shopping-basket for managing the coupons or samples that they are requesting.

Users may also be associated into ad hoc groups of a limited number of persons, such as family units or other living groups. Within a group, users may share and send shopping lists and/or coupons to each other. In this way, groups of individuals and families may share, receive and give coupons to other members of the same family and utilize the same functionality with a common pool of coupons. Multiple cell phone numbers and identities can be linked to a single group account, so that multiple family members can have access. Beyond sharing of coupons, this feature also allows consumers to create shopping cart lists of products to be purchased, as an aid in shopping, with coupons ready for use on any mobile phone of a family/group member. Items purchased may be checked off by any family member, and the purchaser will have the coupons that associated with those items already available to be scanned at checkout. For the minimization of fraud, coupons cannot be sent or shared outside of a group, and groups are limited in size. The group may be limited to family or household members, unless otherwise permitted by a manufacturer.

Companies wishing to participate in a digital coupon program will have a central home page where they can view who is requesting what coupon or free sample. This page will also be customizable and password protected. Customizable information includes available coupons and samples. Using this page, corporate clients will be able to do promotions for various products.

The site will have a product request statistics page where corporate users can view various statistics on what products users are requesting, and how many users are requesting their products.

The site will be easy to use and navigate. The assumption must be that users have no prior computer experience. Every page will be accompanied by clear instructions.

The site will support a back-end tracking of users' activities (What product they are viewing and requesting).

Users will be notified via email when a product that matches their interest is available. Their interest will be determined through their clicking activity and profile.

The site will support a charted comparison of products within the same product family. Corporate users will be able to view this information.

The site will have a back-end system that will be used by employees to perform basic administrative tasks like registering or activating a corporate user.

The site will utilize the 3-tier model. This consists of the presentation layer, the business logic or middle tier and the database. The site will use mostly Microsoft-based technology primarily for the cost and the availability of skills in that platform. The technology that will be used in the site includes:

Database: The database of choice is MS SQL Server. Several highly normalized databases will be created. These databases will house information such as consumer information, available product information, consumer activity information, sample or coupon information, corporate client information, and advertisement information as well as order fulfillment information.

Middleware: The middleware will provide a connection to the database as well as implement the business logic. It will be a combination of COM+ and ASP. The COM+objects will be written in C++ or C# for flexibility reasons. Also some COM+objects will be obtained from Site Server Commerce edition and ad Server.

Presentation layer: This will be two types. A crystal report and an HTML based presentation. The crystal report will provide reporting corporate users while primary viewing of the site will be via regular browsers. Other technologies that will be used in the presentation layer include CSS and Macromedia Flash. The site should make minimal use of cookies.

The site will be built for both Netscape and Internet Explorer versions 4 or higher. AOL users must also be supported.

The website will strategically find the right consumer in the right place for the manufacturer by creating a setting to fit the profile of a manufacturer's brands. Consumers will be targeted by demographic, psycho graphic or through their purchasing behavior. Consumers will be located on the web through contextual marketing techniques. The website will allow for enhancement of product brand objectives (loyalty, brand extensions, line extensions) through sampling and coupons.

The website will allow the manufacturer to build brand equity beyond the delivery of a coupon or sample. It will feature the latest new product news and provide an Opt-in model which forces consumers' choice and showcases the manufacturer's brand. It also provides quantitative and qualitative consumer insight through survey methods which enable consumers to purchase products online. The website will provide candid, unaided consumer feedback about the manufacturer's product. The consumer process will matter by delivering consumers to manufacturer's message. The website will highlight key product features and benefits on product and manufacturer screens. It will promote a manufacturer's entire product line and deliver the manufacturer's marketing messages. It will link to manufacturer's website or e-commerce partner to drive real sales.

The site will educate and engage consumers beyond the sample and include tactics to increase the reach to consumers and encourage product usage. This will be done through Peer-to-Peer ("Refer a Friend" Email) which are persuasive consumer 'word-of-mouth' endorsements to leverage the consumer's passion for the manufacturer's products. Through Product Usage a consumer will be able to select existing recipes from the site's database or use brand recipes to personalize meal plans and shopping lists. Product Usage also increases usage occasions and bridges the gap between the Internet and supermarkets. Through Marketing Inserts (Coupons & Marketing Collateral) where an insert with a sample to encourage trial, track conversion and provide product education. This method will also drive to specific retail chain/stores.

The website will utilize Solo Delivery (including collateral). Impressive presentation of a manufacturer product and brand literature cuts through the clutter. Speedy delivery of the product samples always works best. Solo mailing will maximize brand impact on the market. The sponsoring entity will "own" the envelope. Shipment of samples will be done within 48 hours of request to reinforce brand quickly after first exposure on the website. Customization and brand packaging will include partners to increase brand awareness.

Consumer Insight is important to constructing actionable consumer surveys for tracking. Some of the tools available will include Pre & Post Sample Surveys, Conversion studies, Open-ended qualitative feedback, Online focus groups and brainstorming sessions, Custom-designed research. The site will quantify the impact of sampling through Usage & Purchase Intent, Brand loyalty, Conversion, Brand Understanding & Awareness, Attribute ratings, message retention & comprehension. The website will speed the product development cycle through Concept Testing, Message & Price testing, and including offline events in the research.

The service will involve Retail Partners by teaming up with them online and offline as well as building equity through the trade. Link consumers quickly to multiple sales options. Make it easy for consumers to find manufacturer's product with a Store Locator, co-branded packaging Online: direct to product description The site will integrate with a Customer Relationship Management (CRM) plan. Sampling and couponing can be the driver for an integrated solution.

The present invention thus avoids shortcomings of the prior art by providing and Internet-based service that will allow manufacturers to efficiently and cost effectively access consumers. Consumers that represent a desired demographic profile will be identified by demographically profiling those consumers as they participate in other economic transactions. Desirable consumers will then be induced to visit the Internet server and subscribe to the service and/or will be induced to experiment with products through couponing or sampling.

In this way, a pool of consumers can be assembled by the Internet-based service, with accurate, advance knowledge of their demographic traits. Thus, the pool of consumers assembled for a given couponing or sampling effort may be more directly representative of a desired demographic profile than has been previously possible. At the same time, the Internet-based service may more accurately target demographically correct consumers, to submit feedback on products couponed or sampled to those consumers, via either email/web site or telephone communication. Using the accumulated accurate demographic information, the Internet-based service will be able to accurately identify consumers of a desired demographic to encourage to participate in future couponing/sampling offers.

The Internet-based server may further establish discussion groups or group for a discussion of products. Consumers of a desired demographic may be encouraged to participate in such groups by the offer of additional coupons or samples of products of the same or an economically related manufacturer.

The web application of the present invention is designed to implement a consumer experience with couponing that differs from those known through the prior art. In particular, a consumer walking down an aisle of a grocery store, discovers a product of interest. The consumer wonders if there are any coupons for this product. The consumer takes out his mobile phone or mobile device and navigates to m.samplesaint.com using the mobile web browser. Once there, the consumer logs into the site and chooses the find product coupon option. The consumer is then asked to find the UPC on the product and enter it into the website. After the consumer has entered the number and initiated the search, Samplesaint checks all available resources for the product, and particularly those products near to the consumer's geolocation. When results come back to the consumer's mobile device, coupons that are an exact match appear on top. Coupons of related products appear below exact matches. The consumer can then select one of the coupon offers to find out more about it. Here the consumer can see how much the coupon is worth, when it expires and any other important information. A link on this screen called add to my mobile shopping cart allows the consumer to add the coupon to a queue for use at checkout.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. For example, each of the consumer interaction steps may be performed via telephone in the case of consumers not having or not comfortable with Internet access. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A method of delivering product advertisements, coupons or samples to a customer via the customer's wireless cellular mobile device, comprising storing subscription information for a customer possessing a wireless cellular mobile device, the wireless cellular mobile device at least including location circuitry, cellular mobile circuitry for establishing a data connection via a wireless service provider, and an operating system capable of receiving and installing software applets for operating the wireless cellular mobile device, delivering a software applet to the customer's wireless cellular mobile device via a wireless cellular service provider to which the wireless cellular mobile device is subscribed, the applet including software enabling location circuitry within the mobile device and enabling communication with the mobile device, receiving a location of the mobile device generated by the location circuitry in the customer's wireless cellular mobile device, the location having been obtained by the software applet, and transmitted via the wireless cellular service provider, at the remote server, comparing a location of the mobile device to a predefined radius of a retail location, originating at the remote server a text notification regarding a particular product, and delivering the text notification to the mobile device via the wireless cellular service provider, so that the customer may request further information, responding to the customer's request for further information by delivering from the remote server to the wireless cellular mobile device via the cellular service provider an advertisement, coupon or sample regarding the particular product.

2. The method of claim 1 further comprising receiving an indication delivered by the customer via the software applet that the particular product was not found at the retail location.

3. The method of claim 2 further comprising receiving a location at which the consumer indicated the particular product was not found, the location generated by the location circuitry in the customer's wireless cellular mobile device and obtained by the software applet and transmitted via the wireless cellular service provider.

4. The method of claim 2 further comprising providing a reward to a consumer for accurate identification of a product that could not be found or was out of stock.

5. The method of claim 4 wherein the reward comprises delivering information to the wireless cellular mobile device enabling the consumer to obtain a coupon for or sample of a product using the software applet.

\* \* \* \* \*